US 10,744,645 B2

(12) United States Patent
Wang et al.

(10) Patent No.: US 10,744,645 B2
(45) Date of Patent: Aug. 18, 2020

(54) MEASUREMENT SYSTEM

(71) Applicant: FANUC CORPORATION, Yamanashi (JP)

(72) Inventors: Yuelai Wang, Yamanashi (JP); Soichi Arita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 42 days.

(21) Appl. No.: 16/154,190

(22) Filed: Oct. 8, 2018

(65) Prior Publication Data

US 2019/0111564 A1 Apr. 18, 2019

(30) Foreign Application Priority Data

Oct. 12, 2017 (JP) .................................. 2017-198554

(51) Int. Cl.
*G05B 19/18* (2006.01)
*G05B 19/04* (2006.01)
(Continued)

(52) U.S. Cl.
CPC ............ *B25J 9/1692* (2013.01); *G05B 19/33* (2013.01); *G05B 2219/39033* (2013.01)

(58) Field of Classification Search
CPC ......... B25J 9/1692; B25J 19/00; G05B 19/33; G05B 2219/39033; G01S 7/497; G01S 17/66; G01S 17/06
See application file for complete search history.

(56) References Cited

U.S. PATENT DOCUMENTS 4,714,339 A * 12/1987 Lau ........................ B25J 13/089
356/139.08
4,720,130 A * 1/1988 Andou ................. B25J 15/0616
294/907
(Continued)

FOREIGN PATENT DOCUMENTS

CN 105058387 A 11/2015
CN 105798909 A 7/2016
(Continued)

OTHER PUBLICATIONS

Japanese Office Action dated Jul. 30, 2019, for Japanese Patent Application No. 2017-198554.
(Continued)

*Primary Examiner* — Khoi H Tran
*Assistant Examiner* — Jorge O Peche
(74) *Attorney, Agent, or Firm* — Karceski IP Law, PLLC

(57) ABSTRACT

A measurement system includes a plurality of reflectors of a robot, a measurement apparatus having a laser head which emits a laser beam toward the reflectors and which receives a reflected light from the reflectors, a head driving device which changes orientation of the laser head, and a robot control apparatus which controls the robot based on the calibration operation program and which sequentially places the distal end portion of the robot at a plurality of measurement positions for conducting calibration. The robot control apparatus conducts a head drive control process of receiving controller coordinate data of any one of the plurality of reflectors, which is used at the time of sequentially placing the distal end portion of the robot at plurality of measurement positions, and sending a control signal for changing the orientation of the laser head to the head driving device by using the received controller coordinate data.

2 Claims, 6 Drawing Sheets

(51) Int. Cl.
*B25J 9/16* (2006.01)
*G05B 19/33* (2006.01)

(56) References Cited

U.S. PATENT DOCUMENTS

| | | | |
|---|---|---|---|
| 4,866,362 A | 9/1989 | Parker et al. | |
| 5,790,338 A * | 8/1998 | Kanai | G11B 17/228 360/71 |
| 9,815,204 B2 * | 11/2017 | Hull | B25J 9/1697 |
| 2002/0038855 A1 | 4/2002 | Hwang | |
| 2016/0133502 A1 * | 5/2016 | Won | H01L 21/68707 700/253 |
| 2017/0010094 A1 * | 1/2017 | Iseli | G01B 5/008 |
| 2017/0016712 A1 * | 1/2017 | Suzuki | B25J 9/1692 |
| 2017/0210011 A1 * | 7/2017 | Hull | B25J 9/1697 |
| 2018/0104777 A1 * | 4/2018 | Tombe | B23P 19/10 |
| 2018/0154524 A1 * | 6/2018 | Tombe | B64C 3/128 |
| 2018/0339380 A1 * | 11/2018 | Inagaki | B25J 9/1682 |
| 2019/0091867 A1 * | 3/2019 | Wang | G01S 17/06 |

FOREIGN PATENT DOCUMENTS

| | | |
|---|---|---|
| CN | 106346498 A | 1/2017 |
| CN | 106799745 A | 6/2017 |
| CN | 109551518 A | 4/2019 |
| DE | 4415419 A1 | 11/1995 |
| DE | 10136691 B4 | 9/2016 |
| EP | 0309845 B1 | 4/1992 |
| JP | 2001-025985 A | 1/2001 |
| JP | 2001022418 A | 1/2001 |
| JP | 2002-103259 A | 4/2002 |
| JP | 2006-181591 A | 7/2006 |
| JP | 2011-075391 A | 4/2011 |
| JP | 2011200880 A | 10/2011 |
| JP | 2017-019072 A | 1/2017 |

OTHER PUBLICATIONS

Chinese Office Action dated Mar. 16, 2020, for Chinese Patent Application No. 201811173237.4.
German Office Action dated Apr. 27, 2020, for German Patent Application No. 102018124478.9.

* cited by examiner

FIG. 7

| MEASUREMENT POSITION NUMBER | PARAMETER 1 | PARAMETER 2 | ... | REFLECTOR NUMBER |
|---|---|---|---|---|
| 1 | | | ... | 31b |
| 2 | | | ... | 31c |
| 3 | | | ... | 31a |
| ... | ... | ... | ... | ... |

MEASUREMENT SYSTEM

CROSS-REFERENCE TO RELATED APPLICATIONS

This application is based on and claims priority to Japanese Patent Application No. 2017-198554, filed on Oct. 12, 2017, the entire content of which is incorporated herein by reference.

FIELD OF THE INVENTION

The present invention relates to a measurement system, and more particularly to a measurement system which is used for performing calibration of the position of a distal end portion of a robot.

BACKGROUND OF THE INVENTION

Recently, the tasks a robot is to perform (operations of the robot) at an actual place of installation are set by off-line teaching so as to shorten the time required for setting the robot at the actual place of installation.

In the off-line teaching, a model of the robot, a model of equipment around the robot at the place of installation, a model of a workpiece and the like are set in a simulation device, and an operation program for the robot at the place of installation is made in the simulation device.

An actual position of the distal end portion of the robot is slightly different from the position of the distal end portion of the robot which is calculated by the simulation device due to assembly errors, the influence of gravity or the like. Such differences vary depending on the size of the robot, the weight of the workpiece which is manipulated by the robot and the like, and the differences may be approximately 5 mm in some cases. For this reason, when the robot is operated at the place of installation by the operation program, which is made by off-line teaching, without any modifications, failures may occur.

For the reasons above, the difference between the position of the distal end portion of the robot at the place of installation and a position which is intended by the operation program is measured, and correction (calibration) of the operation program is performed based on the measurement result.

A measurement system for measuring the position of a distal end portion of a robot is known, and the measurement system uses a measuring apparatus for measuring a position of a reflector unit (see Japanese Unexamined Patent Application, Publication No. 2017-019072, for example). This reflector unit has three shafts fixed at the distal end portion of the robot such that longitudinal axes of the shafts make right angles to each other, and six reflectors which are respectively mounted at both ends of the shafts.

SUMMARY OF THE INVENTION

A first aspect of the present invention is a measurement system including: a plurality of reflectors mounted at a distal end portion of a robot; a measuring apparatus having a laser head which emits a laser beam toward the reflector and receives a reflected light from the reflector, and a head driving device which changes orientation of the laser head; and a robot control apparatus in which a calibration operation program for sequentially placing the distal end portion of the robot at a plurality of measurement positions for conducting calibration is stored, and which controls the robot in accordance with the calibration operation program, the robot control apparatus is configured to conduct a head drive control process of receiving controller coordinate data of any one of the plurality of reflectors at the time of sequentially placing the distal end portion of the robot at the plurality of measurement positions, and sending a control signal for changing the orientation of the laser head to the head driving device by using the received controller coordinate data.

A second aspect of the present invention is a measurement system including a plurality of reflectors mounted at a distal end portion of a robot; a measuring apparatus having a laser head which emits a laser beam toward the reflectors and receives a reflected light from the reflectors, and a head driving device which changes orientation of the laser head, the measuring apparatus measuring a position of the reflectors by receiving the reflected light by the laser head; and a robot control apparatus in which a calibration operation program for placing the distal end portion of the robot at a measurement position for conducting calibration is stored, and which controls the robot in accordance with the calibration operation program, wherein the robot control apparatus is configured to conduct a head drive control process of sending a control signal for changing the orientation of the laser head to the head driving device by using the controller coordinate data of any one of the plurality of the reflectors at the time of placing the distal end portion of the robot at the measurement position; wherein, the plurality of reflectors are mounted at the distal end portion of the robot in such a manner that the directions to which incident ranges, each of which is a range capable of reflecting the laser beam, of the reflectors do not overlap with each other; and wherein, the robot control apparatus controls the robot so that the distal end portion of the robot gradually moves to a direction opposite to a deflection direction of the robot by gravity when the laser head does not receive the reflected light after the control signal is sent to the head driving device by the head drive control process.

BRIEF DESCRIPTION OF THE DRAWINGS

FIG. 7 is a diagram of an example showing data structure of a calibration operation program.

DESCRIPTION OF EMBODIMENT(S) OF THE INVENTION

A measurement system 1 according to a first embodiment of the present invention is described hereinafter with reference to drawings.

This measurement system 1 is used for performing calibration of a robot 2.

Figure 1:
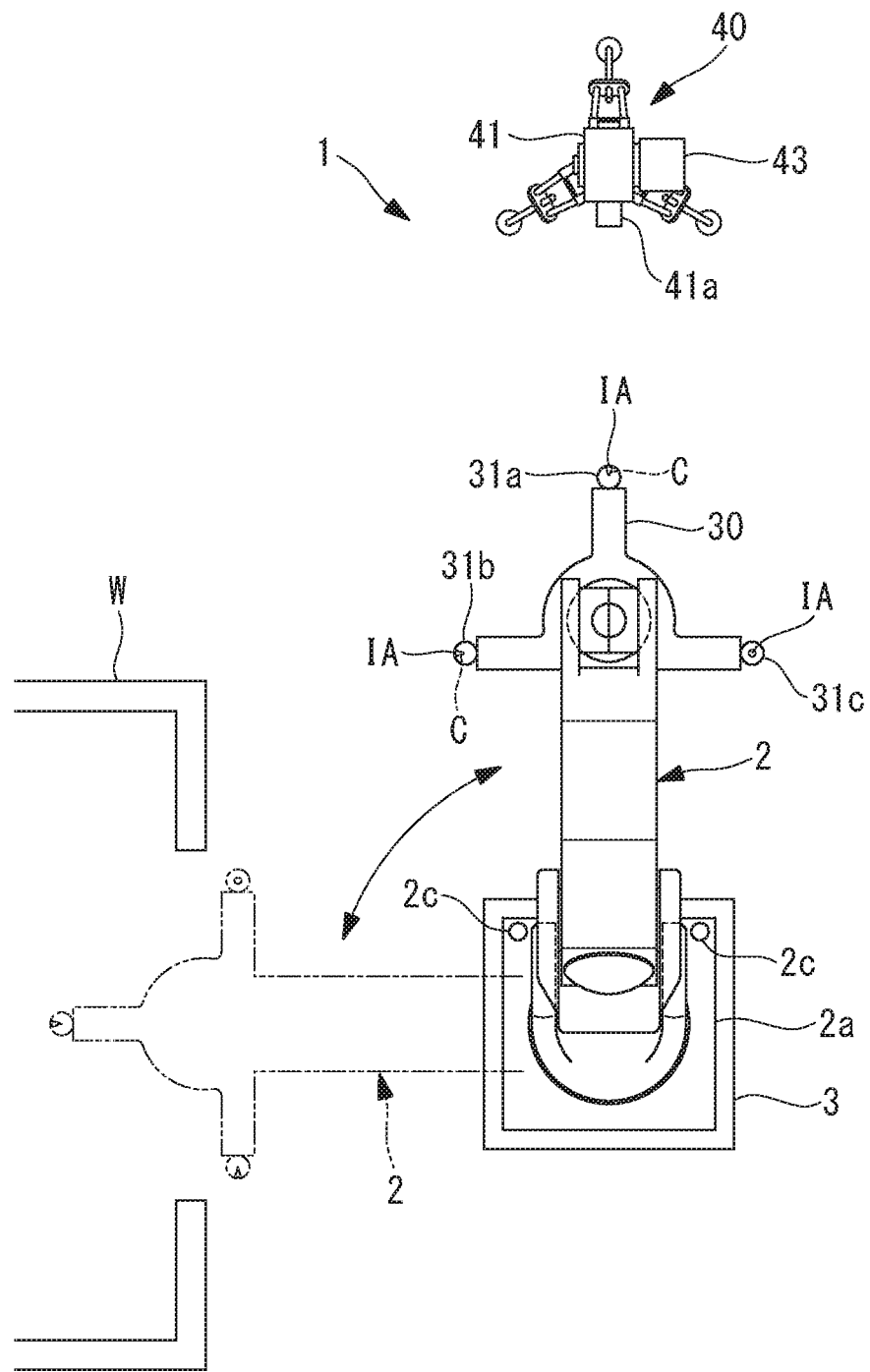
FIG. 1 is a schematic plan view of a measurement system according to an embodiment of the present invention.

The robot 2 performs a predetermined task, such as spot welding to a workpiece W as shown in FIG. 1, for example. The robot 2 includes a plurality of arm members and joints, and also includes a plurality of servo motors 11 for respectively driving the plurality of joints (see FIG. 3). Each servo motor 11 may be formed of a variety of servo motor such as a rotation motor or a linear motor. Each servo motor 11 has an operation position detection device, such as an encoder, which detects an operation position of the servo motor 11, and detected values of the operation position detection devices are transmitted to a robot control apparatus 20.

A processing tool 12 is mounted at a distal end portion of the robot 2, and the processing tool 12 performs spot welding on the workpiece W. When the robot 2 is provided for conveying a workpiece, a chuck a suction device or the like, each of which forms a holding device for holding the workpiece, is mounted at the distal end portion of the robot 2 in place of the processing tool 12.

Figure 2:
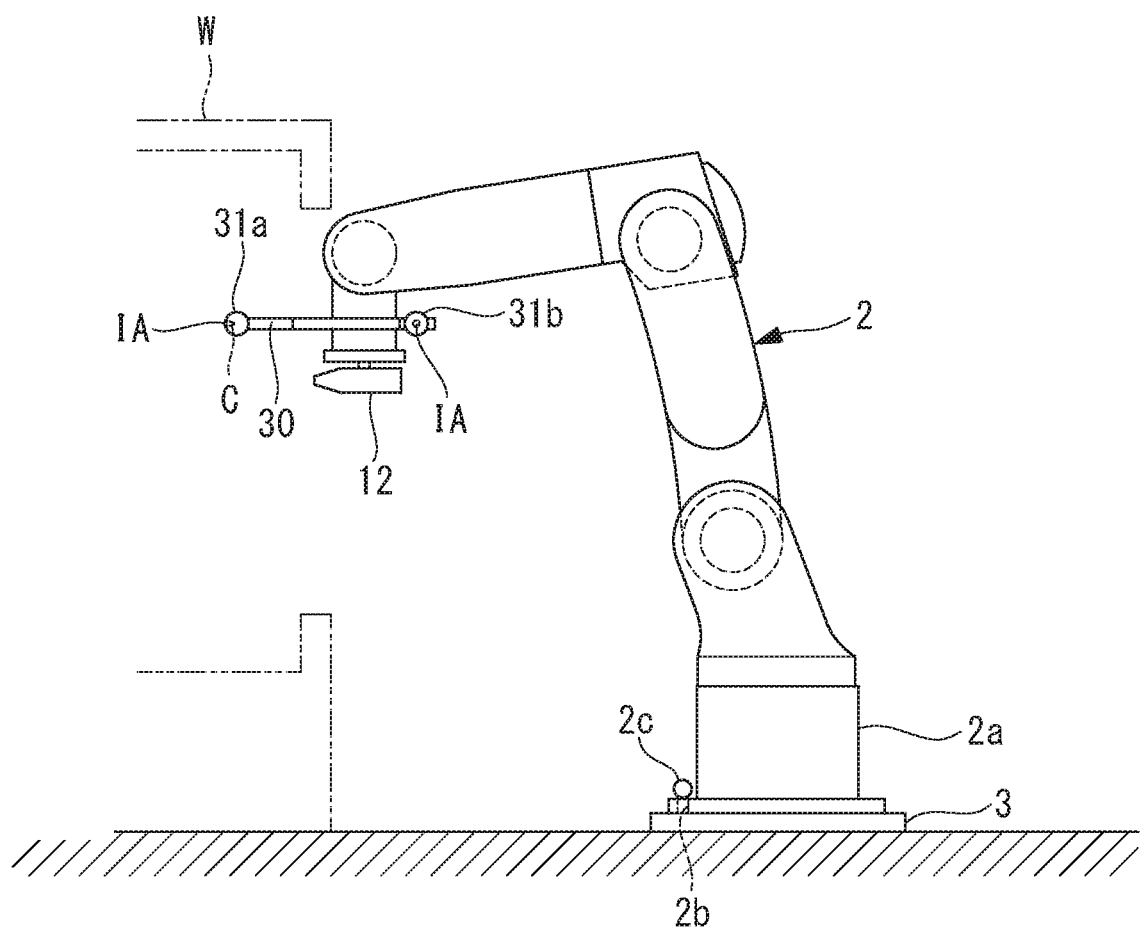
FIG. 2 is a schematic front view of a robot which is measured by the measurement system of this embodiment.

As shown in FIG. 1 and FIG. 2, the robot 2 is finely positioned on a base plate 3 which is accurately positioned. An upper surface of the base plate 3 has a precisely formed flat surface, and is measured at a plurality of positions. Such a measurement allows determination of a horizontal plane of a robot coordinate system of the robot 2 (that is, the flat surface is parallel to an x axis and a y axis of the robot coordinate system).

As shown in FIG. 1 and FIG. 2, reflection members (reference reflection portions) 2c are respectively mounted in two reference holes 2b precisely formed on a base portion 2a of the robot 2. Directions of the x axis and the y axis of the robot coordinate system are set based on positions of the respective reflection members 2c. Further, based on the positions of the respective reflection members 2c and the horizontal plane, a zero point of the robot coordinate system is set at a position slightly above the horizontal plane, and the x axis, the y axis, and the z axis perpendicular to the horizontal plane are set using the zero point as the center.

Figure 3:
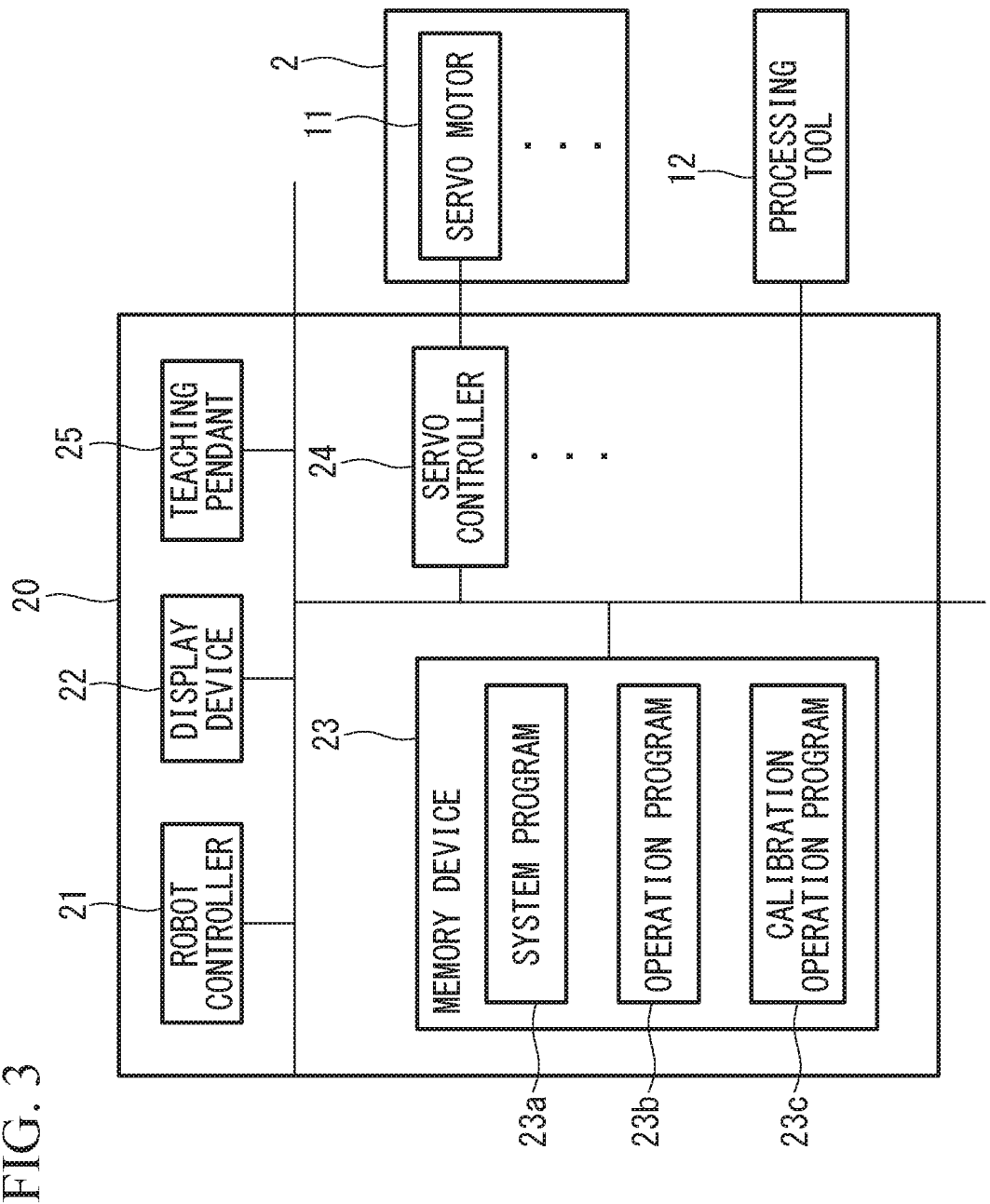
FIG. 3 is a block diagram of the robot which is measured by the measurement system of this embodiment.

As shown in FIG. 3, the robot control apparatus 20 includes, for example: a robot controller 21 having a CPU, a RAM and the like; a display device 22; a memory device 23 having a nonvolatile storage, a ROM and the like; a plurality of servo controllers 24 provided so as to respectively correspond to the servo motors 11 of the robot 2; and a teaching pendant 25 which is connected to the robot control apparatus 20, and can be carried by an operator. The teaching pendant 25 may be configured to perform wireless communication with the robot control apparatus 20.

The memory device 23 stores a system program 23a. The system program 23a is responsible for the basic function of the robot control apparatus 20. The memory device 23 also stores at least one operation program 23b which is made by a simulation device (not shown in the drawing). To be more specific, a model of the robot 2 and a model of the workpiece W shown in FIG. 1 and FIG. 2 are made in the simulation device. The operation program 23b for the robot 2 is made in the simulation device such that the robot 2 performs welding at a plurality of welding points on the inside and outside of the workpiece W while avoiding contact with the workpiece W, and the operation program 23b is stored in the memory device 23. The memory device 23 also stores a calibration operation program 23c.

The robot controller 21 operates in accordance with the system program 23a. In performing welding on the workpiece W, the operation program 23b stored in the memory device 23 is read out, and is temporarily stored in the RAM. Control signals are transmitted to the respective servo controllers 24 according to the operation program 23b which is read out. With such operations, servo amplifiers of the respective servo motors 11 of the robot 2 are controlled, and also emission of a laser beam from the processing tool 12 is controlled so as to perform welding on the workpiece W.

As shown in FIG. 1, FIG. 2, FIG. 4, and FIG. 5, the measurement system 1 includes a plurality of reflectors 31a, 31b, 31c which are mounted at the distal end portion of the robot 2 by a reflector support plate 30, and a measuring apparatus 40. The measurement system 1 also includes a measurement control apparatus 50 shown in FIG. 6. In this embodiment, the measurement control apparatus 50 is incorporated in the measuring apparatus 40. However, the measurement control apparatus 50 may be disposed at another position external to the measuring apparatus 40.

The reflector support plate 30 is formed of a thin metal plate, for example, and is fixed between the distal end portion of the robot 2 and the processing tool 12. Each reflector 31a, 31b, 31c is formed of a spherical member which reflects a laser beam incident on the reflector in a direction substantially equal to a direction along which the laser beam is incident on the reflector. Such a reflection is referred to as retroreflection. Each reflector 31a, 31b, 31c is configured such that the range where retroreflection occurs is limited. A conical shape C is defined to have an apex at the center of the sphere, and an apex angle of 15°, for example, and only a range which falls within the conical shape C is set as an incident range IA where retroreflection is performed.

The diameter of each reflector 31a, 31b, 31c is set to ten and several mm or several mm, and hence the diameter of the incident range IA of each reflector 31a, 31b, 31c is approximately 1 mm to approximately 2 mm. As described above, the incident range IA has a small diameter, and hence calibration of the position of the distal end portion of the robot 2 can be accurately performed. In a task which requires accuracy, such as spot welding, there may be a case where an error is required to be reduced to equal to or less than 1 mm. In such a case, it may be necessary to further reduce the size of the incident range IA.

Figure 4:
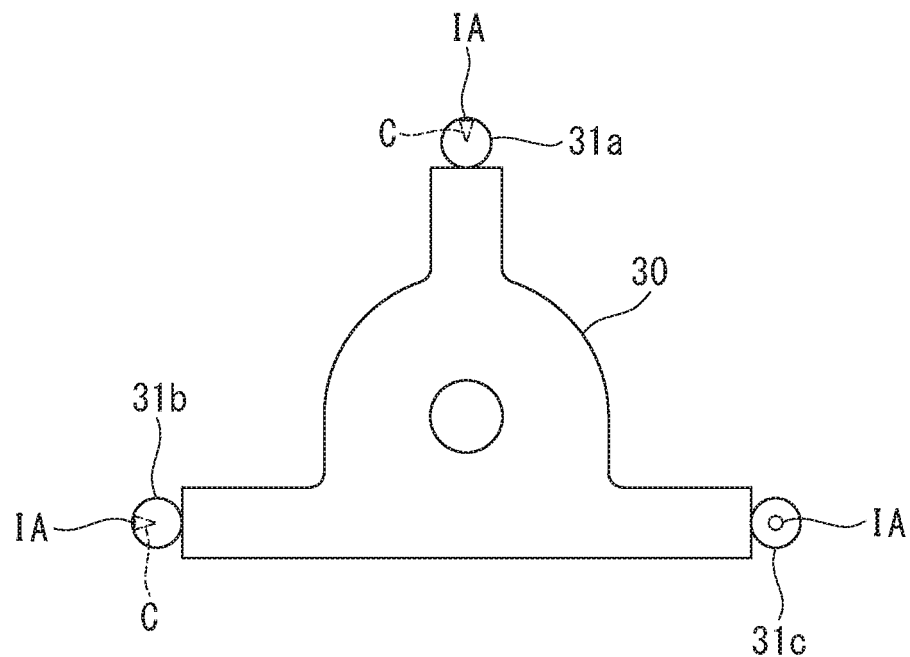
FIG. 4 is a front view of a reflector support plate and reflectors of the measurement system of this embodiment.
Figure 5:
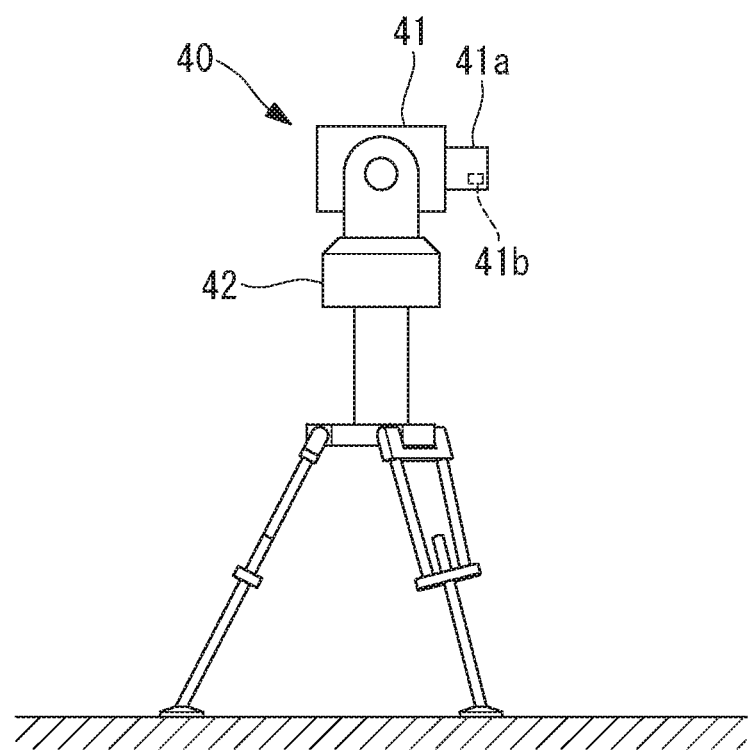
FIG. 5 is a side view of a measuring apparatus of the measurement system of this embodiment.

Further, as shown in FIG. 4, the respective reflectors 31a, 31b, 31c are fixed to the reflector support plate 30 such that optical axes of the incident ranges IA of the respective reflectors 31a, 31b, 31c form angles of 90° to each other. With such a configuration, there is no possibility of a laser beam from the measuring apparatus 40 being reflected simultaneously from the plurality of reflectors 31a, 31b, 31c.

The measuring apparatus 40 includes a laser head 41, a vertical axis motor 42, and a horizontal axis motor 43. The laser head 41 emits a laser beam toward the reflector 31a, 31b, 31c, and receives the reflected light from the reflector 31. The vertical axis motor 42 and the horizontal axis motor 43 form a head driving device which changes orientation of the laser head 41.

The vertical axis motor 42 is provided to rotate the laser head 41 and the horizontal axis motor 43 about a vertical axis, and the horizontal axis motor 43 is provided to rotate the laser head 41 about a horizontally axis. The vertical axis motor 42 and the horizontal axis motor 43 are connected to the measurement control apparatus 50, and the vertical axis motor 42 and the horizontal axis motor 43 are controlled by the measurement control apparatus 50. Further, each motor 42, 43 has an operation position detection device, such as an encoder, which detects an operation position of the motor 42, 43, and detected values of the operation position detection devices are transmitted to the measurement control apparatus 50.

A laser beam emitting section 41a is provided in the laser head 41, and configured such that a laser beam from a laser oscillator (not shown in the drawing) is emitted from the laser beam emitting section 41a. Further, a light receiving sensor 41b is disposed in the laser beam emitting section 41a of the laser head 41, and the light receiving sensor 41b receives the reflected light which is reflected from the reflector. The laser head 41 is connected to the measurement control apparatus 50. The measurement control apparatus 50 controls emission of a laser beam from the laser beam emitting section 41a of the laser head 41. A detection result of the light receiving sensor 41b of the laser head 41 is transmitted to the measurement control apparatus 50.

Figure 6:
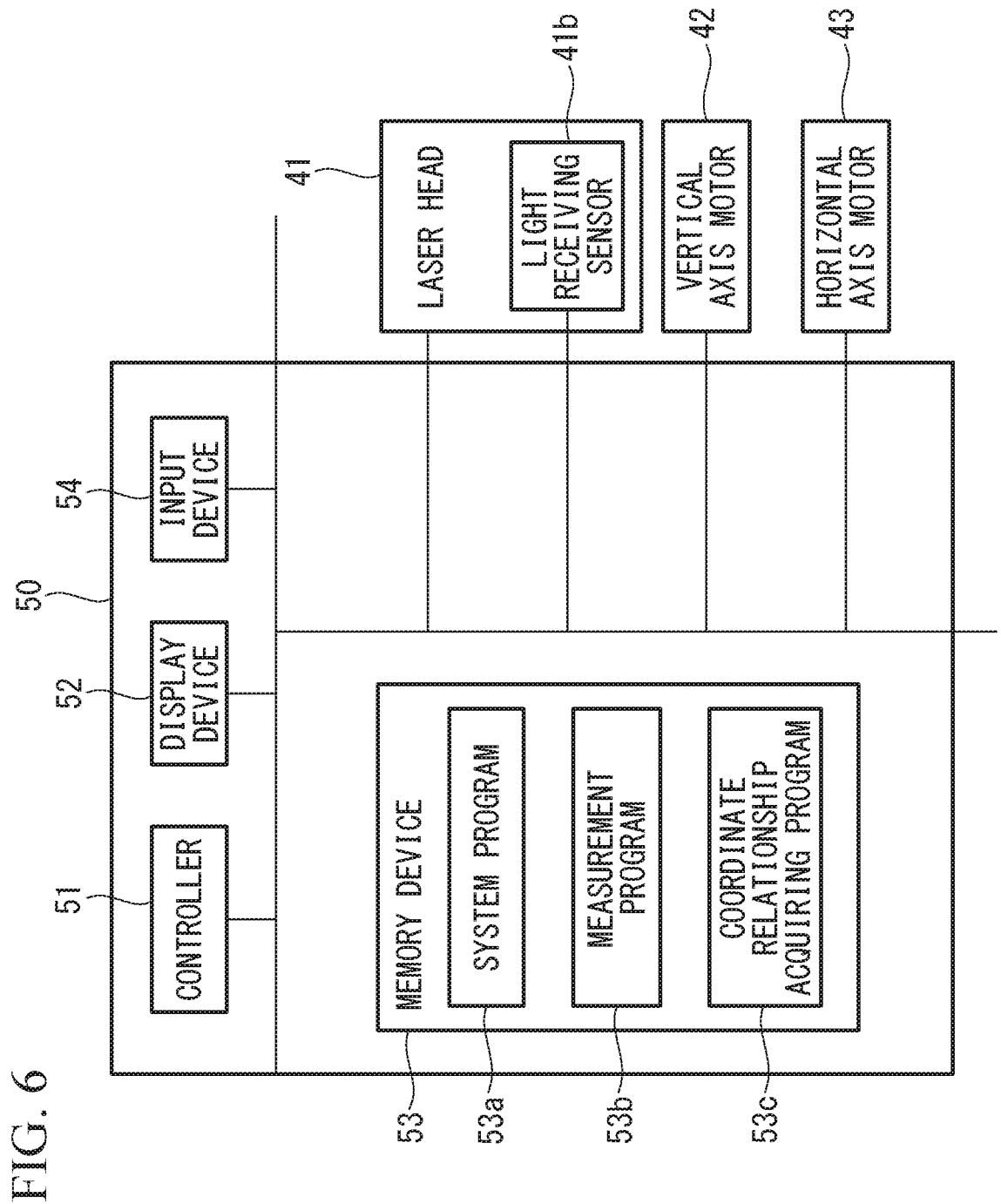
FIG. 6 is a block diagram of the measuring apparatus used in this embodiment.

As shown in FIG. 6, the measurement control apparatus 50 includes, for example: a controller 51 having a CPU, a RAM and the like; a display device 52; a memory device 53 having a nonvolatile storage, a ROM and the like; and an input device 54. The input device 54 may be configured to perform wireless communication with the measurement control apparatus 50.

The memory device 53 stores a system program 53a. The system program 53a is responsible for the basic functions of the measurement control apparatus 50. The memory device 53 also stores a measurement program (head drive control means) 53b, and a coordinate relationship acquiring program (coordinate relationship acquisition means) 53c. The measurement program 53b measures the positions of the reflectors 31a, 31b, 31c mounted at the distal end portion of the robot 2. The coordinate relationship acquiring program 53c acquires a corresponding relationship of a measuring-apparatus coordinate system, which is a coordinate system of the measuring apparatus 40, with respect to a robot coordinate system, which is a coordinate system of the robot 2.

An operation of the controller 51 when acquiring the corresponding relationship of the measuring-apparatus coordinate system and the robot coordinate system is described. The measuring apparatus 40 is installed at an approximate position for measurement. For example, when the controller 51 receives a request signal which is inputted by the input device 54 or the like and which requests a corresponding relationship of the coordinate systems, the controller 51 is operated by the coordinate relationship acquiring program 53c. With such an operation, a laser beam is emitted from the laser head 41 to the respective reflection members (reference reflection portions) 2c mounted in two reference holes 2b formed on the base portion 2a of the robot 2, and the reflected light from each reflection member 2c is received by the light receiving sensor 41b. Positions of the respective reflection members 2c with respect to the measuring apparatus 40 are measured in this manner.

In this embodiment, the controller 51 may controls the vertical axis motor 42 and the horizontal axis motor 43 so as to adjust the orientation of the laser head 41, which allows laser beam to irradiate the respective reflection members 2c from the laser head 41. Alternatively, manually adjusting the orientation of the laser head 41 by an operator may allow a laser beam to irradiate the respective reflection members 2c from the laser head 41.

Subsequently, the controller 51 acquires the position of a zero point of the measuring-apparatus coordinate system with respect to the zero point of the robot coordinate system based on the measured positions of the respective reflection members 2c, and also acquires respective directions (gradients) of the x axis and the y axis of the measuring-apparatus coordinate system with respect to the x axis and the y axis of the robot coordinate system. With such operations, the corresponding relationship (the position and the direction) of the measuring-apparatus coordinate system and the robot coordinate system can be acquired. It may be configured to acquire respective directions (gradients) of the x axis, the y axis, and the z axis of the measuring-apparatus coordinate system with respect to the x axis, the y axis, and the z axis of the robot coordinate system.

Subsequently, an operation of the robot controller 21 and the controller 51 when performing calibration is described below. When the robot controller 21 and the controller 51 receive a predetermined trigger signal, for example, a calibration request signal which is inputted by the input device 54 or the like, the robot controller 21 reads out the calibration operation program 23c, and transmits control signals to the respective servo controllers 24 according to the calibration operation program 23c which is read out. With such operations, servo amplifiers of the respective servo motors 11 of the robot 2 are controlled.

In this embodiment, the calibration operation program 23c sequentially arranges the distal end portion of the robot 2 at several tens to several hundreds of measurement positions which are set in advance. The several tens to several hundreds of measurement positions are preferably positions disposed on a trajectory on which the distal end portion of the robot 2 is moved by the operation program 23b. To make an operation of the robot 2 which takes various types of posture close to an operation of the robot 2 in the simulation device as much as possible, it is preferable to perform the measurement at many measurement positions as described above so as to perform calibration. The posture of the distal end portion of the robot 2 also varies corresponding to a measurement position.

In this embodiment, each measurement position is set such that the incident range IA of any one of the reflectors 31a, 31b, 31c is directed toward the measuring apparatus 40 side.

That is to say, in the calibration operation program 23c, a plurality of parameter values for controlling the servomotors 11 is corresponding to the reflector number of the reflector whose incident range IA faces the measuring apparatus 40 out of the reflector 31a, 31b, 31c (refer to FIG. 7, for example).

The above described calibration operation program 23c is created by using a simulation device (not shown in the drawings), for example, as a device to conduct the off-line teaching. For instance, the model of the robot 2, the model of the workpiece W shown in FIGS. 1 and 2, and the model of the measuring apparatus 40 are created in the simulation device, and the robot 2 is moved in the simulation device so that the distal end portion of the robot 2 is placed at several hundreds of measurement positions along a trajectory on which the distal end portion of the robot 2 is moved by the operation program 23b. And, with regard to the several hundreds of measurement positions, a plurality of parameter values for controlling the servomotors 11 is stored in the memory device of the simulation device.

Further, the distal end of the robot 2 is positioned in the simulation device 4 so that the incident range IA of any one of the reflectors 31a, 31b, 31c is directed toward the laser head 41 side of the measuring apparatus 40 at each position of the several hundreds of measurement positions. And, with regard to each position of the several hundreds of measurement positions, a reflector number of the reflector whose incident range IA is directed toward the measuring device 40 is stored in the memory device of the simulation device.

The simulation device does not actually move the robot 2, and therefore, the distal end portion of the robot 2 can be positioned at the several hundreds of measurement positions rapidly. Also, it is possible to perform condition-setting in the simulation device so as to automatically decide the several hundreds of the measurement positions along the trajectory of the distal end portion of the operation program 23*b*, and it is possible to perform condition-setting in the simulation device so that the incident range IA of any one of the reflectors 31*a*, 31*b*, 31*c* is directed toward the laser head 41 of the measuring device 40.

Further, in a condition in which deflection of the robot 2, which is caused by loads added to the entire robot 2 or to the distal end portion thereof, is included in the condition of the simulation device, it may be possible to configure the simulation device so that the parameter values and the reflector numbers for the several hundreds of the measuring positions are stored in the memory device.

Subsequently, each time the distal end portion of the robot 2 is arranged at each measurement position, the robot controller 21 transmits the number of the reflector out of the reflectors 31*a*, 31*b*, 31*c* which has the incident range IA directed toward the measuring apparatus 40 side, and transmits position coordinates of the reflector to the measuring apparatus 40. The robot controller 21 may transmit the numbers of the reflectors and position coordinates of the reflectors at several tens to several hundreds of respective measurement positions to the measuring apparatus 40 at one time, and also the measurement positions, the measurement position numbers, or the like may be transmitted to the measuring apparatus 40 each time the distal end portion of the robot 2 is arranged at each measurement position. Transmission of the number of a reflector is not always necessary.

Subsequently, the controller 51 is operated by the measurement program 53*b*, and when the controller 51 receives the position coordinates of the reflector (controller coordinate data) from the robot controller 21, the controller 51 converts the position coordinates into position coordinates of the measuring-apparatus coordinate system based on the corresponding relationship of the measuring-apparatus coordinate system with respect to the robot coordinate system. Further, the controller 51 makes a control command to operate the vertical axis motor 42 and the horizontal axis motor 43 such that the laser beam emitting section 41*a* is directed toward the converted position coordinates. The vertical axis motor 42 and the horizontal axis motor 43 are controlled in response to the control command, and also a laser beam is emitted from the laser head 41.

When the light receiving sensor 41*b* of the laser head 41 receives the reflected light, measured position coordinates of the reflector on which the laser beam is irradiated are acquired using an elevation angle and a swing angle of the laser head 41 at the time of receiving the reflected light, and a distance between the measuring apparatus 40 and the reflector on which the laser beam is irradiated. The distance is acquired based on a phase or the like of the reflected light which the light receiving sensor 41*b* receives. The acquired measured position coordinates are transmitted to the robot controller 21. The elevation angle and the swing angle are acquired based on detected values of the operation position detection devices which are respectively incorporated in the vertical axis motor 42 and the horizontal axis motor 43, for example. It may be configured such that the measured position coordinates are converted into position coordinates of the robot coordinate system based on a corresponding relationship of the measuring-apparatus coordinate system and the robot coordinate system, and the converted measured position coordinates are transmitted to the robot controller 21.

Subsequently, the robot controller 21 receives the measured position coordinates or the converted measured position coordinates from the controller 51. Then, the robot controller 21 acquires the difference between the measured position coordinates or the converted measured position coordinates and the position coordinates of the reflector which are transmitted to the controller 51 by the robot controller 21. The robot controller 21 corrects the operation program 23*b* based on the difference. With such operations, calibration of the robot 2 can be performed on the operation program 23*b*.

Also, the laser beam from the leaser head 41 may accurately irradiate a position within the incident range IA of the reflectors 31*a*, 31*b*, 31*c* only by controlling the vertical axis motor 42 and the horizontal axis motor 43 based on the controller coordinate data. However, when the incident range IA is small, the laser beam from the laser head 41 may radiate a position which is in the vicinity of the incident range IA of the reflectors 31*a*, 31*b*, 31*c* only by controlling the vertical axis motor 42 and the horizontal axis motor 43 based on the controller coordinate data.

In this case, the controller 51 is operated by the measurement program 53*b* so that, for example, the laser head is made to perform a search operation. In the search operation, scanning is performed such that the irradiation position of the laser beam traces a circle. Particularly, when the diameter of the incident range IA of the reflector 31*a*, 31*b*, 31*c* is reduced so as to more accurately perform calibration of the position of the distal end portion of the robot 2, the search operation is performed in many cases.

Soon after the search operation is started or when a predetermined time passes from the start of the search program, the controller 51 may send information that the search operation is performed based on the measurement program 53*b* to the robot control apparatus 20, and the robot controller 21 of the robot control apparatus 20 may control the servomotors 11 so that the distal end portion of the robot 2 gradually moves upward.

Due to the gravity, it is highly possible that the distal end portion of the robot 2 is located lower than the distal end portion of the robot 2 in the simulation device, and therefore, by gradually moving the distal end portion of the robot 2 upward, it is possible to shorten time required for performing the search operation.

Soon after the laser beam from the laser head 41 is radiated on a position within the incident range IA by the search operation and then the position is measured, the controller 51 is operated by the measurement program 53*b* to send information that the position has been measured to the robot control apparatus 20. On the other hand, the robot controller 21 of the robot control apparatus 20 stores the controller coordinate data of the corresponding reflector at the time of receiving the information as a position coordinate after conducting the search operation in the memory device 23. And, the robot controller 21 receives the measurement position coordinates or the converted measurement position coordinates from the controller 51, and the robot controller 21 acquires the difference between the measured position coordinates or the converted measured position coordinates, which are transmitted to the controller 51, and the position coordinates of the reflector by the robot controller 21. The robot controller 21 corrects the operation program 23*b* based on the difference so as to perform the calibration.

As described above, according to this embodiment, the control signal for changing the orientation of the laser head 41 is transmitted to the vertical axis motor 42 and the horizontal axis motor 43 by using the controller coordinate data of the reflector 31*a*, for example, out of the plurality of reflectors 31a, 31b, 31c, which prevents the measuring device from measuring the positions of the reflectors 31b, 31c by unintentionally irradiating the laser beam from the laser head 41 on the reflectors 31b, 31c. The plurality of the reflectors 31a, 31b, 31c are not placed at the same coordinate position, and therefore, it is possible to perform the accurate calibration by preventing the unintentional reflectors 31b, 31c from being used for the measurement.

Moreover, the control signal for changing the orientation of the laser head 41 is transmitted to the vertical axis motor 42 and the horizontal axis motor 43 by using the controller coordinate data. That is to say, it is unnecessary to conduct such control that the laser head 41 follows the movement of the distal end portion of the robot 2 at all time, which is possible to shorten the time required for performing the calibration by promptly moving the distal end portion of the robot 2 to the next measurement position.

According to this embodiment, the plurality of reflectors 31a, 31b, 31c are mounted at the distal end portion of the robot 2 in such a manner that the directions to which the respective incident ranges IA of the reflectors face for reflecting the laser beam do not overlap with each other.

Therefore, when the incident range of the reflector 31a is directed to the laser head 41 side, for example, the incident ranges of the other reflectors 31b, 31c do not face the laser head 41 side, which prevents the irradiation of the laser beam on the unintended reflectors 31b, 31c more accurately.

Also, since the robot 2 is deflected by the influence of gravity, it is highly possible that the distal end portion of the robot 2 is located lower than the distal end portion of the robot 2 in the simulation device. However, according to this embodiment, the robot 2 is controlled so that the distal end portion of the robot 2 gradually moves toward the direction opposite to the gravity deflection direction when the laser head 41 does not receive the reflected light by the influence of the deflection of the robot 2. With this movement of the robot 2, it becomes possible to measure the position of the intended reflector 31a, or it becomes possible to do so promptly.

The calibration of the robot 2 is conducted by placing the distal end portion of the robot 2 at the plurality of the measurement piston so as to measure the positions of the reflectors 31a, 31b, 31c, and the accuracy of the calibration gets higher as the number of measurement positions increases. There is a case that the measurement of the positions of the reflectors 31a, 31b, 31c is suspended when the laser head 41 has not been receiving the reflected light for a predetermined period of time, however, according to this embodiment, the movement of the robot 2 allows to the measurement of the positions of the reflectors 31a, 31b, 31c, or allows the prompt measurement thereof, which is advantageous for performing the accurate calibration.

Also, this embodiment shows the search operation which performs the scanning in such a manner that the irradiation position of the laser beam traces a circle. Whereas, when a laser beam is made to irradiate the position close to the incident range IA, the following configuration may be adopted. A visual sensor provided to the measuring apparatus 40 images the irradiation direction of the laser beam, and image data is subjected to image processing, thus acquiring a positional relationship between the position of the laser beam and the incident range IA. Based on the acquired positional relationship, the controller 51 controls the vertical axis motor 42 and the horizontal axis motor 43 such that a laser beam falls within the incident range IA.

The following aspects of the present invention are derived from the aforementioned disclosure.

A first aspect of the present invention is a measurement system including: a plurality of reflectors mounted at a distal end portion of a robot; a measuring apparatus having a laser head which emits a laser beam toward the reflector and receives a reflected light from the reflector, and a head driving device which changes orientation of the laser head; a robot control apparatus in which a calibration operation program for sequentially placing the distal end portion of the robot at a plurality of measurement positions for conducting calibration is stored, and which controls the robot in accordance with the calibration operation program; and a head drive control means which receives controller coordinate data of any one of the plurality of reflectors at the time of sequentially placing the distal end portion of the robot at the plurality of measurement positions, and which sends a control signal for changing the orientation of the laser head to the head driving device by using the received controller coordinate data.

According to this aspect, the control signal for changing the orientation of the laser head is sent to the head driving device by using the controller coordinate data of any one of the plurality of reflectors, which prevents the measurement apparatus from measuring a position of an unintended reflector by irradiating the laser beam from the laser head to such reflector. The plurality of reflectors are not placed at the same coordinate position, and therefore, it is possible to perform the accurate calibration by preventing the unintended reflectors from being measured.

Also, the control signal for changing the orientation of the laser head is sent to the head driving device by using the controller coordinate data. That is to say, it is not necessary to conduct such control that the laser head follows the movement of the distal end portion of the robot at all time, which is capable of shortening the time required to perform the calibration by promptly moving the distal end portion of the robot to the next measurement position.

According to the above aspect, it is preferable that the plurality of reflectors are mounted at the distal end portion of the robot in such a manner that the directions to which incident ranges, each of which is a range capable of reflecting the laser beam, of the reflectors face do not overlap with each other.

In this aspect, when the incident range of the intended reflector is directed toward the laser head side, the incident ranges of the other reflectors do not face the laser head side, which prevents the irradiation of the laser beam on the unintended reflectors more accurately.

A second aspect of the present invention is a measurement system including a plurality of reflectors mounted at a distal end portion of a robot; a measuring apparatus having a laser head which emits a laser beam toward the reflectors and receives a reflected light from the reflectors, and a head driving device which changes orientation of the laser head, the measuring apparatus measuring a position of the reflectors by receiving the reflected light by the laser head; a robot control apparatus in which a calibration operation program for placing the distal end portion of the robot at a measurement position for conducting calibration is stored, and which controls the robot in accordance with the calibration operation program; and a head drive control means which sends a control signal for changing the orientation of the laser head to the head driving device by using the controller coordinate data of any one of the plurality of the reflectors at the time of placing the distal end portion of the robot at the measurement position; wherein, the plurality of reflectors are mounted at the distal end portion of the robot in such a manner that the directions to which incident ranges, each of which is a range capable of reflecting the laser beam, of the reflectors do not overlap with each other; and wherein, the robot control apparatus controls the robot so that the distal end portion of the robot gradually moves to a direction opposite to a deflection direction of the robot by gravity when the laser head does not receive the reflected light after the control signal is sent to the head driving device by the head drive control means.

The robot is deflected by the influence of gravity, and therefore, it is highly possible that the distal end portion of the robot is located lower than the distal end portion of the robot in a simulation device, for example. Whereas, according to this aspect, the robot is controlled so that the distal end portion of the robot gradually moves to a direction opposite to the deflection direction when the laser head do not receive the reflected light because of an influence of the deflection of the robot. This movement of the robot allows measurement of the position of the reflector by using the measuring apparatus, or allows the measurement promptly.

The calibration of the robot is conducted by placing the distal end portion of the robot at a plurality of measurement positions so as to measure the position of the reflector, and therefore, the accuracy of the calibration gets higher as the number of measurement positions increases. There is a case where the position measurement cannot be performed when the laser head does not receive the reflected light. With this embodiment, it is possible to measure the position of the reflector by the movement of the robot, or, it is possible to do so promptly, which is advantageous for performing the calibration accurately.

Also, the control signal for changing the orientation of the laser head is sent to the head driving device by using the coordinate data of any one of the plurality of reflectors. That is to say, it is not necessary to conduct such control that the laser head follows the movement of the distal end portion of the robot at all time, which is capable of shortening the time required to perform the calibration by promptly moving the distal end portion of the robot to the next measurement position.

With this aspect, it is preferable that the robot control apparatus is configured to conduct calibration of the robot by using the controller coordinate data of the reflector, which is used at the time of measuring the position in the robot control apparatus and measured coordinate data obtained by position measurement when the laser head receives the reflected light and conducts the position measurement of the reflector while the distal end portion of the robot is gradually moving toward the direction opposite to the deflection direction as controlled by the robot control apparatus.

According to the aforementioned aspects, the time required for performing calibration can be shortened and, further, accurate calibration can be performed.

The invention claimed is:

1. A measurement system, comprising:
a plurality of reflectors mounted at a distal end portion of a robot;
a measuring apparatus having a laser head and a head driving device, wherein the laser head emits a laser beam, as incident light, toward the plurality of reflectors, wherein the laser head receives reflected light from the reflectors, wherein the head driving device changes an orientation of the laser head, and wherein the measuring apparatus measuring a position of the reflectors by receiving the reflected light by the laser head; and
a robot control apparatus in which a calibration operation program is stored, wherein the robot control apparatus controls the robot in accordance with the calibration operation program, wherein the calibration operation program places the distal end portion of the robot at a measurement position for conducting calibration,
wherein the robot control apparatus executes a head drive control process by sending a control signal to the head driving device to change the orientation of the laser head using controller coordinate data, wherein the controller coordinate data is recognized by the robot control apparatus when the distal end portion of the robot is placed at the measurement position,
wherein each of the plurality of reflectors are mounted so that reflected light is generated when the incident light is within an incident range and wherein the incident ranges of each of the plurality of reflectors do not overlap with each other, and
wherein the robot control apparatus moves the distal end portion of the robot opposite to a direction of gravity when the laser head does not receive the reflected light after the control signal is sent to the head driving device by the head drive control process.

2. The measurement system according to the claim 1, wherein the measurement system is configured to conduct calibration of the robot by using the controller coordinate data and by using measured coordinate data, wherein the measured coordinate data is obtained by position measurement when the laser head receives the reflected light and conducts the position measurement of the plurality of reflectors while the distal end portion of the robot is moving opposite to the direction of gravity.

* * * * *